United States Patent [19]

Schuermann

[11] Patent Number: 5,543,798
[45] Date of Patent: Aug. 6, 1996

[54] METHOD OF PROVIDING A SYNCHRONIZED DATA STREAM SUITABLE FOR USE IN A COMBINED FDX AND HDX RF-ID SYSTEM

[75] Inventor: Josef H. Schuermann, Oberhummel, Germany

[73] Assignee: Texas Instruments Deutschland GmbH, Germany

[21] Appl. No.: 241,831

[22] Filed: May 12, 1994

[30] Foreign Application Priority Data

May 19, 1993 [EP]  European Pat. Off. ............. 93108209

[51] Int. Cl.$^6$ .................................................. G01S 13/74
[52] U.S. Cl. .................. 342/42; 342/44; 342/50; 342/51
[58] Field of Search ...................... 395/200, 575, 395/550; 342/42, 44, 50, 51; 235/375

[56] References Cited

U.S. PATENT DOCUMENTS

| | | | |
|---|---|---|---|
| 5,025,492 | 6/1991 | Viereck | 342/144 |
| 5,030,807 | 7/1991 | Landt et al. | 235/375 |
| 5,053,774 | 10/1991 | Schuermann et al. | 342/44 |
| 5,211,129 | 5/1993 | Taylor et al. | 119/3 |
| 5,305,008 | 4/1994 | Turner et al. | 342/44 |
| 5,347,280 | 9/1994 | Schuermann | 342/42 |

*Primary Examiner*—Kevin A. Kriess
*Assistant Examiner*—Dennis M. Butler
*Attorney, Agent, or Firm*—James C. Kesterson; Richard L. Donaldson; William E. Hiller

[57] ABSTRACT

In a method for transmitting a data message comprising a synchronization section and a data section stored in a transponder device (10) to an interrogating device (12) in full duplex mode. The interrogating device (12) continuously emits an interrogating command, the receipt of which in the transponder device (10) prompts output of the data message. Both the sync section and the data section of the data message each comprise a predetermined number of bits in accordance with a given transmission protocol. In the sync section, a predetermined number N of sequential bits of duration $\tau$ is replaced by a lesser number n of sequential bits of longer duration T, where: $T=\tau N/n$. The interrogating device (12) determines the location of the sync section and thus the start of the data section in the received data message by identifying the bits having the longer duration T. For the ratio N/n a value is selected which is smaller than 1.5.

18 Claims, 1 Drawing Sheet

METHOD OF PROVIDING A SYNCHRONIZED DATA STREAM SUITABLE FOR USE IN A COMBINED FDX AND HDX RF-ID SYSTEM

BACKGROUND OF THE INVENTION

The invention relates to a method of transmitting a data stream or message from an FDX (full duplex) transponder to an interrogator or reader capable of reading both FDX and HDX RF-ID systems. The data stream comprising a synchronization section and a data section stored in the FDX transponder device for transmission to an interrogating device in full duplex mode during which the interrogating device is continuously emitting an interrogating command. The receipt of the interrogating command by the transponder device prompts the output of a data message.

Various types of recognition systems are taught by the following commonly assigned U.S. Pat. and Applications: U.S. Pat. Nos. 5,287,112; 5,270,717; 5,196,735; 5,170,493; 5,168,282; 5,148,404; 5,126,745; 5,073,781; 5,053,774; 5,025,492; Ser. No. 08/021,123, filed Feb. 23, 1993; Ser. No. 08/065,286, filed May 21, 1993; and Ser. No. 08/086,786, filed Jul. 2, 1993. Various systems conforming to the teachings of the foregoing documents are marketed under the name TIRIS ("Texas Instruments Registration and Identification System"). A recognition system similar in result to, but structurally and functionally specifically different from, TIRIS is disclosed in U.S. Pat. No. 4,918,955.

In many recognition systems, an interrogator (sometimes called a "transmitter/receiver" or a "reader") selectively radiates energy from a first inductor or antenna. The radiated energy may by itself constitute or may contain an "interrogation signal." In many cases, the interrogation signal is simply an AC burst of energy or an AC signal of a selected frequency and duration. The interrogation signal is received by a second inductor or antenna associated with a transponder (sometimes called a "tag"). The transponder is attached to, embedded or implanted in, or otherwise on or in an object. In response to its receipt of the interrogation signal, the transponder produces a "recognition signal," which typically comprises a code. In some recognition systems, the recognition signal is transmitted by the transponder back to the interrogator via the inductors or antennas. In other systems the interrogation signal itself is selectively loaded according to a code in the transponder. Transponders associated with objects "matching" certain criteria produce predetermined recognition signals. Transponders associated with other objects not matching the criteria may respond to the interrogation signal but transmit recognition signals different from the predetermined recognition signal.

The interrogator includes facilities which analyze the recognition signals to determine which of the analyzed signals are the predetermined recognition signal produced by the matching objects. If an analyzed recognition signal is the predetermined recognition signal, this fact may be utilized by the interrogator or by facilities responsive to the interrogator to cause one or more of a number of events or operations involving the matching objects to occur. If an analyzed recognition signal is not the predetermined recognition signal, such events or operations either do not occur or occur differently.

In an exemplary TIRIS system, transponders may be attached to or implanted in objects which constitute the corpus of living animals, such as steers or hogs. The animals may be counted or not counted, directed or not directed to a specific area or similarly discriminated on the basis of the predetermined recognition signal being produced or not produced in an interrogator by the transponders. Thus, "matching" animals in a group of animals might include those belonging to a specific owner or animals which are of a particular size or age. Similarly, transponders may be attached to commingled luggage in an airport. An interrogator adjacent to a conveyor carrying the luggage effects directing the luggage to the luggage-handling operations of the appropriate airline.

Another environment in which TIRIS recognition systems may be used relates to motor vehicles. One use finds an interrogator associated with the ignition switch of a vehicle and transponders associated with ignition keys. Only a key which includes a transponder "matching" the interrogator and which is capable of operating the ignition switch can effect engine starting.

Another vehicle-related recognition system of the AVI variety finds transponders in authorized vehicles and interrogators located at toll plazas. As an authorized vehicle passes through the plaza without stopping, the interrogator treats the presence of a recognition signal as confirmation of authorization, identifies the vehicle through analysis of the recognition signal, and updates toll charge billing data which is stored in associated facilities. At the end of a billing cycle, the stored billing data is used to prompt periodic payment of cumulated toll charges by the vehicle's owner. The updated billing data may also be sent by the interrogator to the transponder and facilities associated therewith which permit the vehicle's operators to periodically ascertain the current cumulated toll charges ascribable to the vehicle.

Portability and/or space limitations usually result in the interrogator of a TIRIS-type of recognition system being not very powerful. Also, the recognition signals, that is the signals transmitted back to the interrogator from the object-included transponder, may be derived from the limited energy radiated from the interrogator, not from energy derived from an object-contained power source, such as a battery, as is typical in systems of the AVI type. While the use of a battery with object-included circuitry of a TIRIS system is technically possible, the large size and resulting unwieldiness would lead to severe use restrictions—implanting a transponder having a battery in an animal would prove to be difficult and/or costly—or rejection by users—the presence of a battery in a key-included transponder would render the key annoyingly large—.

In TIRIS and other recognition systems wherein the transponder is "batteryless", the interrogation signal from the interrogator may include an RF component. The antenna or inductor of the transponder may be connected to a capacitor in the transponder to form a parallel resonant circuit which resonates at the frequency of such RF component. An energy storage element, such as a storage capacitor connected in series to a diode, may be connected to the resonant circuit, so that energy derived from the RF component of the interrogation signal is stored in the storage capacitor. This stored energy is used to energize the remainder of the transponder, which may be implemented as circuitry on or in one or more chips or integrated circuits. The transponder, therefore, may comprise a very small "package"—the package may be generally cylindrical, with a length of about 1¼ inches or less and a diameter of about ⅛ inch or less—which includes the antenna or inductor, the resonant circuit, the energy storage capacitor and the integrated circuit.

Recognition systems may include transponders which include only a resonant circuit, of which the transponder's antenna is the inductor. See U.S. Pat. No. 4,918,955. Such systems may also include transponders generally appropriate for batteryless operation utilizing one or more coding or modulation techniques and/or code modulation. For specific use in recognition systems implementing half-duplex operation, see commonly assigned U.S. patent application Ser. Nos. 08/021,123, 08/065,286 and 08/086,786. For recognition systems using full-duplex operation see commonly assigned U.S. patent application Ser. No. 08/212,123. For systems using both half duplex and full duplex techniques see commonly assigned U.S. patent application Ser. Nos. 08/065,286 and 08/086,786. Other full duplex recognition systems are described in U.S. Pat. No. 4,730,188 issued to Milheiser and U.S. Pat. No. 5,211,129 issued to Taylor et al.

As noted, the transponder package may, *inter alia*, be implanted in an animal, typically subcutaneously, or placed in other environments which may be hostile to the transponder or to which the transponder may be hostile.

To this end, the transponders are typically placed in glass or plastic tubes to provide protection from damage caused by impact forces incident to dropping or rough handling. The tubes also protect the transponders from hostile environments, such as the body fluids of an animal. The tubes further protect the environment, which may again be the body of an animal, from the deleterious effects which might otherwise be caused by a "foreign body" such as the transponder.

In transmitting a data message from an FDX transponder device to an interrogating device it is usual to proceed on the basis of a specific transmission protocol which precisely defines how the data message is configured. For example, it has been proposed to compose the data message of a synchronization section of a selected number of bits followed by a data section of another selected number of bits which is typically greater than the number of bits in the synchronization section. The synchronization section is required so that the interrogating device receiving the data message can be synchronized to the bit rate and so that the start of the data section, containing the actual information to be transmitted, can be explicitly identified or determined.

One prior art method of identifying the synchronization section, as an example only, is to always use the same bit pattern for this synchronization section of the data message. This technique has the disadvantage, however, that all possible bit patterns can no longer be used in the data section. This is because the same bit pattern might occur in the data section as well as in the synchronization section. In such an event, explicitly establishing the start of the data section in the data message would no longer be possible.

To eliminate such a restriction as regards the content of the data section, another possible technique is to apply the so-called code-violation method in the synchronization section. In this technique, it is assumed that in transmitting the data message the individual bits are output at a prescribed bit rate. To identify the synchronization section 3 bits in direct sequence are replaced by 2 bits. The duration of the 2 bits is greater than the 3 bits, so that the total duration of the 2 bits is the same duration as the duration of the 3 bits. This means that in the synchronization section, 2 bits having a slower bit rate occur with a correspondingly longer duration than the standard bit rate used by the data section. Thus, the interrogating device is able to identify the synchronization section from the occurrence of these bits of longer duration and thus determine or identify where the data section containing the information to be transmitted begins. Which of the 3 bits in the synchronization section has been replaced by 2 bits of longer duration is determined by the transmission protocol selected for the system.

A code violation method wherein three bits are replaced by two bits of longer duration, results however in disadvantages when the data transmission is made in the FDX (full duplex mode) with ASK (amplitude shift keying) modulation. In such a data transmission technique, the interrogation command is continuously transmitted by the interrogating device and the answer or response by the transponder device occurs at the same time so that they overlap in time. "Continuously" in an FDX transmission mode means that the output of the interrogation commands lasts at least as long as the data message (including both the synchronization section and the data section) so that the aforementioned overlap in time occurs. If the carder frequency used is between 130 and 140 KHz (such as, for example 132.2 KHz used by TIRIS) at which the interrogating device outputs the interrogation command and if the bit rates of the data message are within the same range (approx. 136.2 or 132.2 KHz for TIRIS) the spectral components produced by the synchronization bits of longer duration result in a sideband for demodulation which in the interrogating device are overlapped by the carrier frequency such that they extend into the range of phase noise of the transmitted data signals. Demodulation of the data section is made considerable more difficult by this, and in some instances may even be impossible.

Therefore, it is an object of this invention to provide a technique so that the code violation method can be used in a data exchange between a transponder device and an interrogating device in full duplex mode with ASK modulation.

SUMMARY OF THE INVENTION

Other objects and advantages will be obvious and will in part appear hereinafter, and will be accomplished by the present invention which discloses a method of providing synchronization of a transmitted data message from an FDX (full duplex) transponder to a reader or interrogation device. The data message is of the type which includes a synchronization section followed by a data section, and is stored in the transponder device for transmission to the interrogation device in full duplex mode. In general, both the sync section and the data section of the data message each comprise a predetermined number of bits in accordance with a given transmission protocol. To provide identification of the sync section, a predetermined number N of sequential bits of duration $\tau$ is "replaced" by a lesser number n of sequential bits of longer duration T, where: $T=\tau N/n$ and whereby the interrogating device determines or "sees" the location of the sync section and thus the start of the data section in the received data message by identifying the n bits having the longer duration T. More specifically, the method comprises the steps of continuously transmitting an interrogation command from the interrogation device. The transmitted interrogation command is received by the FDX transponder which then in response to the command generates the data message. The complete data message is generated by allocating a period of time for the synchronization section which is at least equivalent to four or more sequential bits N each of which have a duration $\tau$. A number n of synchronization bits having a duration T are then generated. The number n is smaller than N such that $T=\tau N/n$ and such that the ratio N/n is greater than 1 and less than 1.5. A predetermined number of bits, either "0" or "1" and having a duration $\tau$ are then generated for the data section of the message according to the specific data to be transmitted and in accordance with a selected transmission protocol. The complete data message which includes both the synchronization section and the data section is then transmitted from the transponder to the interrogation device while the interrogation device is still transmitting the interrogation command. The data message is received by the interrogation device and the synchronization section identified so as to determine the beginning of the data section.

In a first preferred embodiment, N=6 and n=5 such that the N/n ratio is 1.2. Also in the first preferred embodiment, the synchronization ratio includes two additional bits having a duration τ such that the total duration of the synchronization section is 8 τ. Also in the preferred embodiment, the data section comprises 64 bits having a duration τ.

BRIEF DESCRIPTION OF THE DRAWINGS

The above features of the invention will be more clearly understood from consideration of the following description in connection with the accompanying drawings in which.

DETAILED DESCRIPTION OF THE PREFERRED EMBODIMENTS

Figure 1:
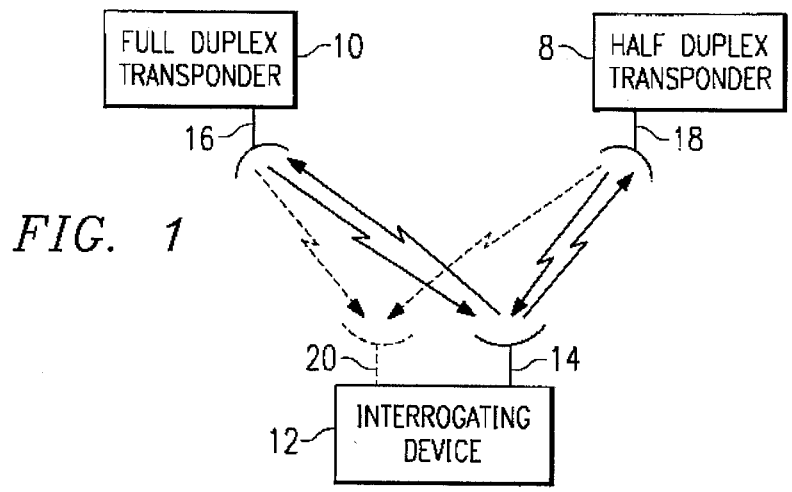
FIG. 1 is a schematic view illustrating a combination reader or interrogation device for reading both FDX and HDX transponders.

Referring now to FIG. 1, there is shown an HDX transponder device 8 and an FDX transponder device 10 both of which can be read or identified by combination interrogator or reader 12. It will, of course, be appreciated that although only one each FDX and HDX transponder are shown, a large number of each transponder type having unique identification codes may be read by interrogation device 12. In the embodiment shown, interrogation device 12 includes antenna 14 which transmits an interrogation signal to either antenna 16 connected to FDX transponder 10, or antenna 18 connected to HDX transponder 8. As shown, both HDX transponder 8 and FDX transponder 10 include single antennas, both of which can receive the interrogation signal from interrogation device 12 and send a response signal back to interrogation device 12. However, other types of both HDX and FDX transponders may incorporate separate transmit and receive antennas. Likewise, although interrogation device 12 is discussed with respect to a single transmit/receive antenna 14, an interrogator with separate antennas for transmitting and receiving may be appropriate and is also suitable for use with this invention. According to FIG. 1, receiver antenna 20 (illustrated in dashed lines) is shown receiving a response (also shown by dashed lines) from HDX transponder 8 and FDX transponder 10.

Figure 2:
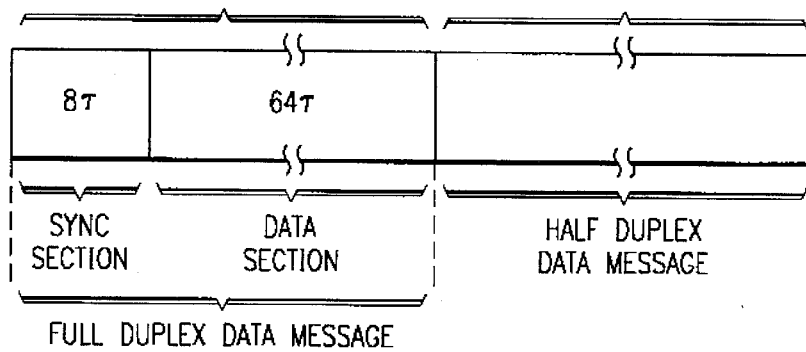
FIG. 2 is a timing diagram showing how the combination reader of FIG. 1 provides a method of reading either an FDX or HDX transponder.

Now referring to FIG. 2, there is shown an interrogation cycle for operating a combination HDX/FDX system such as shown in FIG. 1. As shown in FIG. 2, the combination reader or interrogator 12 operates with an interrogation cycle which transmits an interrogation command of a selected duration indicated by Portion A. This interrogation command is followed by a period of no transmissions indicated by Portion B. As will be discussed in more detail, hereinafter, according to a preferred embodiment, combination reader or interrogator 12 will receive a full response from an FDX transponder during the same time period the interrogation command is being transmitted by the interrogation device 12. That is, the FDX data message overlaps the interrogation command. Thus, the identifying response from the FDX transponder occurs during Portion A. For an HDX transponder, the interrogation command which occurs during Portion A, wakes up the HDX transponder and often is used as a source of power by the HDX transponder. The HDX identifying response is then transmitted during the Portion B while the interrogation device is not transmitting.

Figure 3:
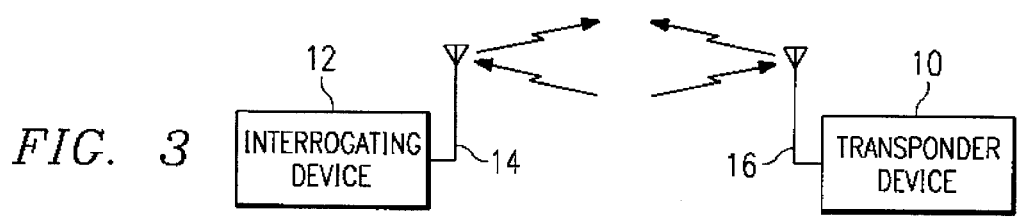
FIG. 3 is a schematic view illustrating a reader or interrogation device for reading an FDX transponder.

Referring now to FIG. 3, there is shown a system which only includes FDX transponder 10 and a reader or interrogator 12 which only reads FDX transponders similar to transponder 10.

Figure 4:
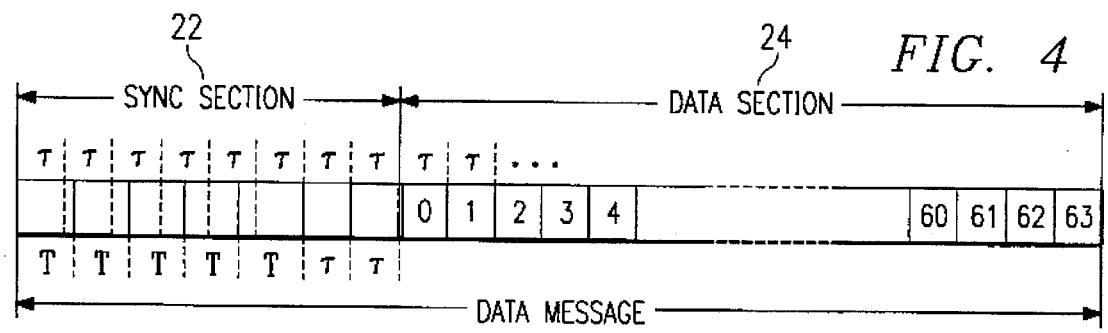
FIG. 4 illustrates the timing diagram of a response signal from an FDX transponder which occurs at the same time as the interrogation signal and which shows the "soft code violation" of the transmission for identifying the synchronization section to determine the beginning point of the data section.

FIG. 4 illustrates a timing diagram of the response signal for an FDX transponder of the type shown in either FIG. 1 or FIG. 3. It will be appreciated that the interrogation cycle for a reader which can interrogate both FDX or HDX transponders may require a period of silence or no signal transmission during which time the HDX transponder is transmitting such as shown in Portion B of FIG. 2. However, the FDX response occurs during Portion A while the interrogation signal is still being transmitted. Consequently, FIG. 4, may represent the entire interrogation cycle for a system which only reads or interrogates FDX transponders or may represent Portion A only of an interrogation cycle for a combination system which can read both FDX and HDX transponders.

As shown in FIGS. 1 and 3, a data message is to be transmitted between an interrogating device 12 and a transponder device 10, each device having an antenna 14 and 16 respectively by means of which both the interrogation command and the data message is transmitted and received respectively in the form of high-frequency signals, such as, for example, about 134 KHz. The data message transmitted between the transponder device 10 and the interrogating device 12 is composed of a sync section 22 which has a total time period allocation of 8 τ(equivalent to 8 bits where each bit has a duration τ) and a data section 24 of 64 bits having a duration τ on the basis of a selected transmission protocol. However, according to this invention, a "soft code violation" technique is used wherein instead of using the first sequential 6 bits of duration τ, 5 bits are generated having an overall duration which is equal to that of the replaced 6 bits and therefore, of course, these 5 bits are of correspondingly longer duration. Also as shown, the 5 bits of longer duration are followed by 2 further bits having the original duration τ. For the duration T of the 5 bits provided in place of the original 6 bits of duration τ, we have:

$$T = N/n \cdot \tau$$

where:

N = number of original bits to be replaced in the sync section n = numbers of bits of longer duration and is less than N In the selected example, the ratio N/n has the value 1.2 which means that the duration of the 5 bits in sequence replacing the 6 original bits is 1.2 times longer than the duration of the original bits. These 5 bits of longer duration are then followed, as mentioned, by 2 further bits having the original duration so that the overall duration of the sync section remains 8 τ. By making use of the method described, the speed at which the individual 64 bits of the data message having a duration τ are transmitted remains unaffected.

In FIG. 4, the data message is shown with its sync section 22 and its data section 24. As shown and discussed above, the sync section has a 5 bit duration T and a 2 bit duration τ. The 6 bits indicated by dashed lines are those which would be in the sync section 22 in place of the 5 bits having the duration T if all bits were to have the same duration τ. From this, it is evident that the 5 bits having the duration T are generated to take the place of the 6 bits of duration τ.

Since the longer duration bits are extended in length merely by the factor 1.2, there is no disadvantage for transmission of the data message and in particular for the decoding to be executed in the interrogating device. Even in full duplex mode, the spectral components attributable to the slower bit rate are removed sufficiently far away from the carrier frequency of the interrogation command so that no unwanted phase noise of the transmitter is able to hamper the interrogation device 12 to make demodulation difficult or even impossible.

Thus, although there has been described to this point a particular embodiment of an FDX data transmission technique, it is not intended that such references and embodiments be considered as limitations upon the scope of this invention except insofar as is set forth in the following claims.

What is claimed is:

1. A method of providing synchronization of a transmitted data message from an FDX (full duplex) transponder to an interrogation device, said data message including a synchronization section followed by a data section stored in said transponder device for transmitting to said interrogation device in full duplex mode, said method comprising the steps of:

transmitting an interrogation command from said interrogation device;

receiving said interrogation command at said transponder device;

generating said data message by said transponder in response to said interrogating command, said generating step comprising the steps of:

allocating the synchronization section of said data message a period of time at least equivalent to N sequential bits each of which have a duration τ and where N is four or more, generating n sequential bits, wherein n is smaller than N and each of the n sequential bits has a duration T such that T=τ N/n, and such that the ratio N/n is greater than 1 and less than 1.5;

allocating a predetermined number of bits having a duration τ in accordance with a selected transmission protocol as the data section of said message;

transmitting said data message from said transponder to said interrogation device, said data section of said data message being transmitted subsequent to said synchronization section; and receiving said data message at said interrogation device and identifying said synchronization section to determine the beginning of said data section.

2. The method of claim 1 wherein the predetermined number of bits having a duration τ allocated to the data section of said data message is 64.

3. The method of claim 1 wherein the number of sequential bits N is 6, and wherein said synchronization section has a total duration of N sequential bits plus at least one additional bit of duration τ.

4. The method of claim 1 wherein n=N−1.

5. The method of claim 3 wherein said synchronization section has two additional bits of duration τ.

6. The method of claim 5 wherein n=N−1.

7. The method of claim 1 wherein N=6 sequential bits having the duration τ and n=5 sequential bits of duration T such that N/n=1.2.

8. The method of claim 7 wherein said synchronization section has a total duration of N sequential bits plus two additional bits of duration τ.

9. The method of claim 7 wherein the predetermined number of bits having a duration τ allocated to the data section of said data message is 64.

10. The method of providing synchronization of a transmitted FDX data message from an FDX transponder to an interrogation device capable of reading both said FDX transponder as well as an HDX transponder, said FDX data message including a synchronization section followed by a data section stored in said FDX transponder device for transmission to said interrogation device in full duplex mode comprising the steps of:

transmitting an interrogation command from said interrogation device for a first selected period of time followed by a second selected period of time during which no interrogation command is transmitted by said interrogation device so that said interrogation device can receive a response signal from an HDX transponder;

receiving said interrogation command at said FDX transponder device;

generating said FDX data message by said transponder in response to said interrogation command comprising the steps of:

allocating the synchronization section of said FDX data message a period of time at least equivalent to N sequential bits, each of which has a duration τ and where N is four or more, generating n sequential bits, wherein n is smaller than N and each of the n sequential bits has a duration T such that T=τ N/n, and such that the ratio N/n is greater than 1 and less than 1.5;

allocating a predetermined number of sequential bits N having a duration τ in accordance with a selected transmission protocol as the data section of said FDX data message;

transmitting said FDX data message from said transponder to said interrogation device, said data section of said FDX data message being transmitted subsequent to said synchronization section;

receiving said FDX data message at said interrogation device and identifying said synchronization section to determine the beginning of said data section, said generating, transmitting and receiving steps all occurring during said first selected period of time.

11. The method of claim 10 wherein the predetermined number of bits having a duration τ allocated to the data section of said data message is 64.

12. The method of claim 10 wherein the number of sequential bits N is 6 and wherein said synchronization section has a total duration of N sequential bits plus at least one additional bit of duration τ.

13. The method of claim 10 wherein n=N−1.

14. The method of claim 12 wherein said synchronization section includes two additional bits of duration τ.

15. The method of claim 14 wherein n=N−1.

16. The method of claim 10 wherein N=6 sequential bits having the duration $\tau$ and n=5 sequential bits of duration T such that N/n=1.2.

17. The method of claim 16 wherein said synchronization section has a total duration of N sequential bits plus two additional bits of duration $\tau$.

18. The method of claim 16 wherein the predetermined number of bits having a duration $\tau$ allocated to the data section of said data message is 64.

* * * * *